United States Patent
Steinke

(10) Patent No.: US 7,527,489 B2
(45) Date of Patent: *May 5, 2009

(54) APPARATUS FOR VACUUM FORMING A TIRE, WHEEL OR OTHER ITEM FROM AN ELASTOMERIC MATERIAL

(75) Inventor: Richard A. Steinke, Boulder City, NV (US)

(73) Assignee: Amerityre, Boulder City, NV (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/438,142

(22) Filed: May 22, 2006

(65) Prior Publication Data

US 2007/0269548 A1    Nov. 22, 2007

(51) Int. Cl.
*B29C 33/10* (2006.01)

(52) U.S. Cl. ...................... 425/28.1; 425/546; 425/562; 425/812

(58) Field of Classification Search ................ 425/28.1, 425/546, 562, 578, 405.1, 812
See application file for complete search history.

(56) References Cited

U.S. PATENT DOCUMENTS

| | | | | |
|---|---|---|---|---|
| 3,200,180 A | * | 8/1965 | Russ et al. ................... | 425/582 |
| 4,272,309 A | * | 6/1981 | Payne et al. .................. | 156/117 |
| 4,287,930 A | * | 9/1981 | McIntosh et al. ............. | 152/526 |
| 4,573,894 A | | 3/1986 | Blayne et al. | |
| 5,152,951 A | | 10/1992 | Ahmad et al. | |
| 5,906,836 A | * | 5/1999 | Panaroni et al. ............... | 425/47 |
| 6,165,397 A | * | 12/2000 | Panaroni et al. ............. | 264/45.5 |
| 2006/0049546 A1 | * | 3/2006 | Steinke et al. .............. | 425/28.1 |

* cited by examiner

*Primary Examiner*—James Mackey
(74) *Attorney, Agent, or Firm*—M. Reid Russell

(57) ABSTRACT

A vacuum forming apparatus for forming a tire, wheel, or other item in a mold having a cavity with the shape of the item to be cast that is contained in the apparatus. The vacuum forming apparatus utilizes a bell shaped outer cover arranged to seal along its lower edge to a mold base plate, and includes a canister maintained under a deep vacuum and arranged in or connected to the apparatus as a reservoir to receive a mixture of urethane constituents, with the deep vacuum removing air from that mixture, and the air free mixture is passed through a valve and into the mold cavity. A low level vacuum is pulled through a vent valve in the bell shaped outer cover to pull the flow of urethane material through the cavity, filling the mold. With the cavity filled, the canister valve is shut and the vent valve in the bell shaped outer cover is closed, allowing the urethane material in the mold cavity to cure, and the mold is broken open and the cast item is removed from the cavity.

9 Claims, 12 Drawing Sheets

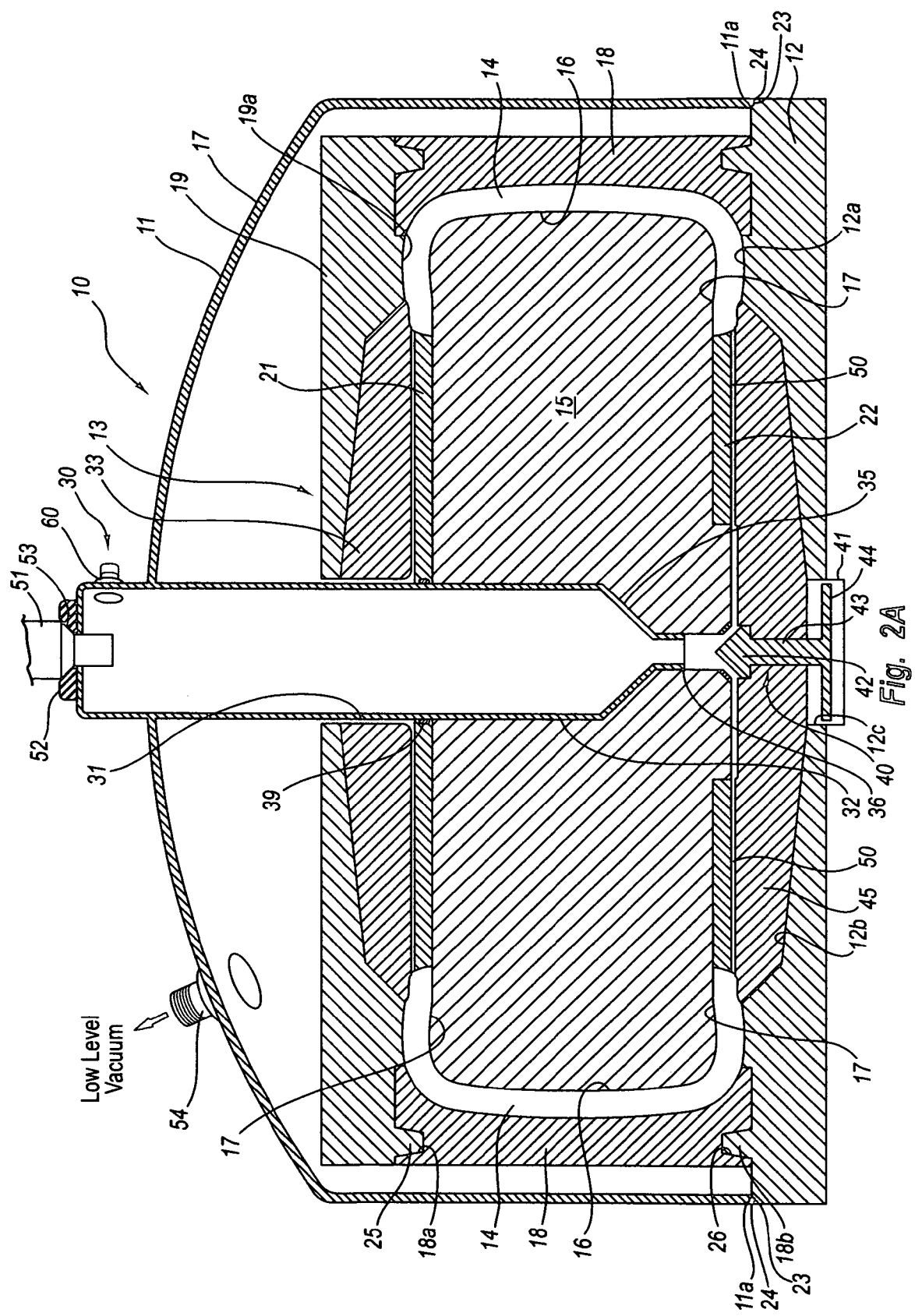

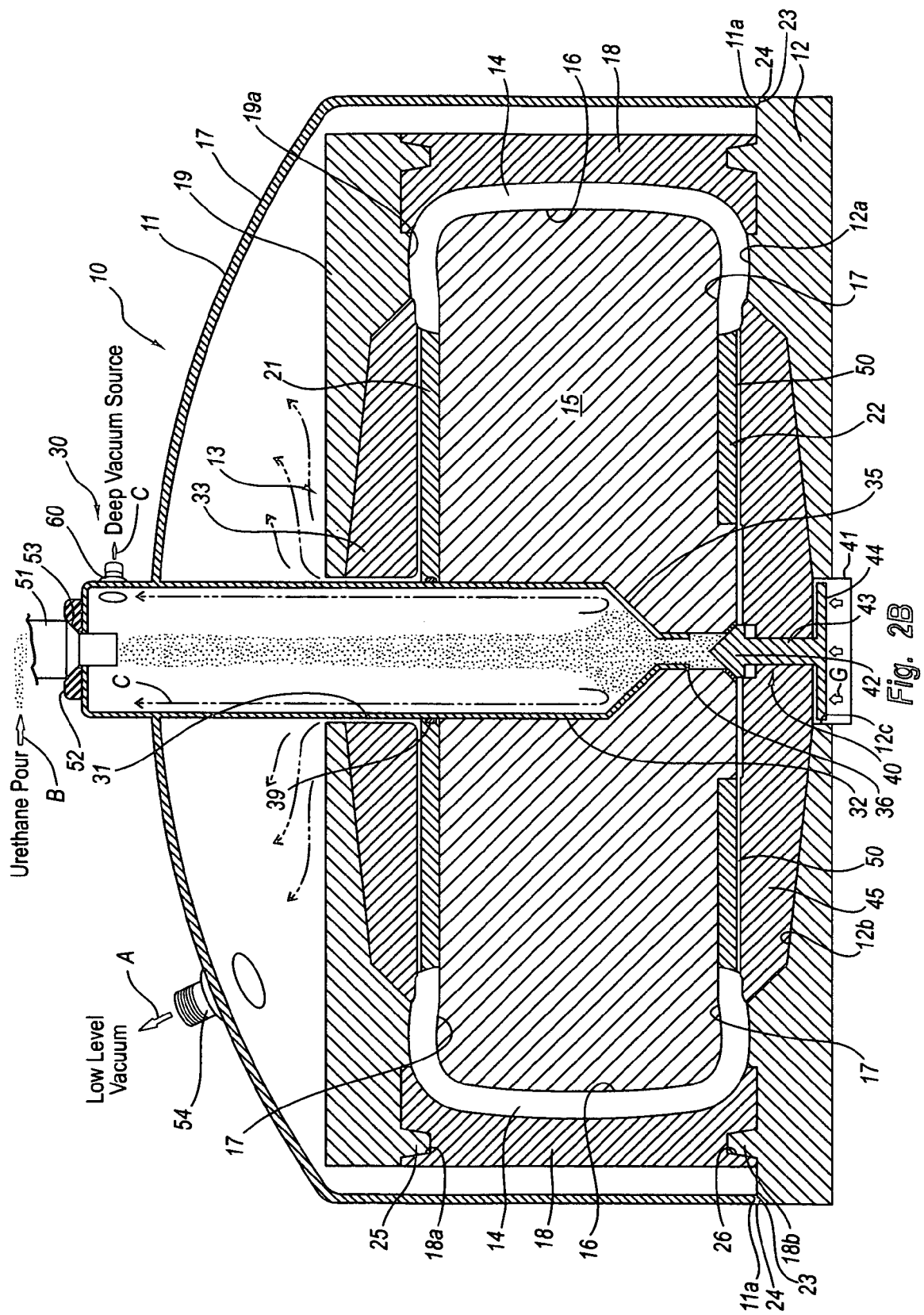

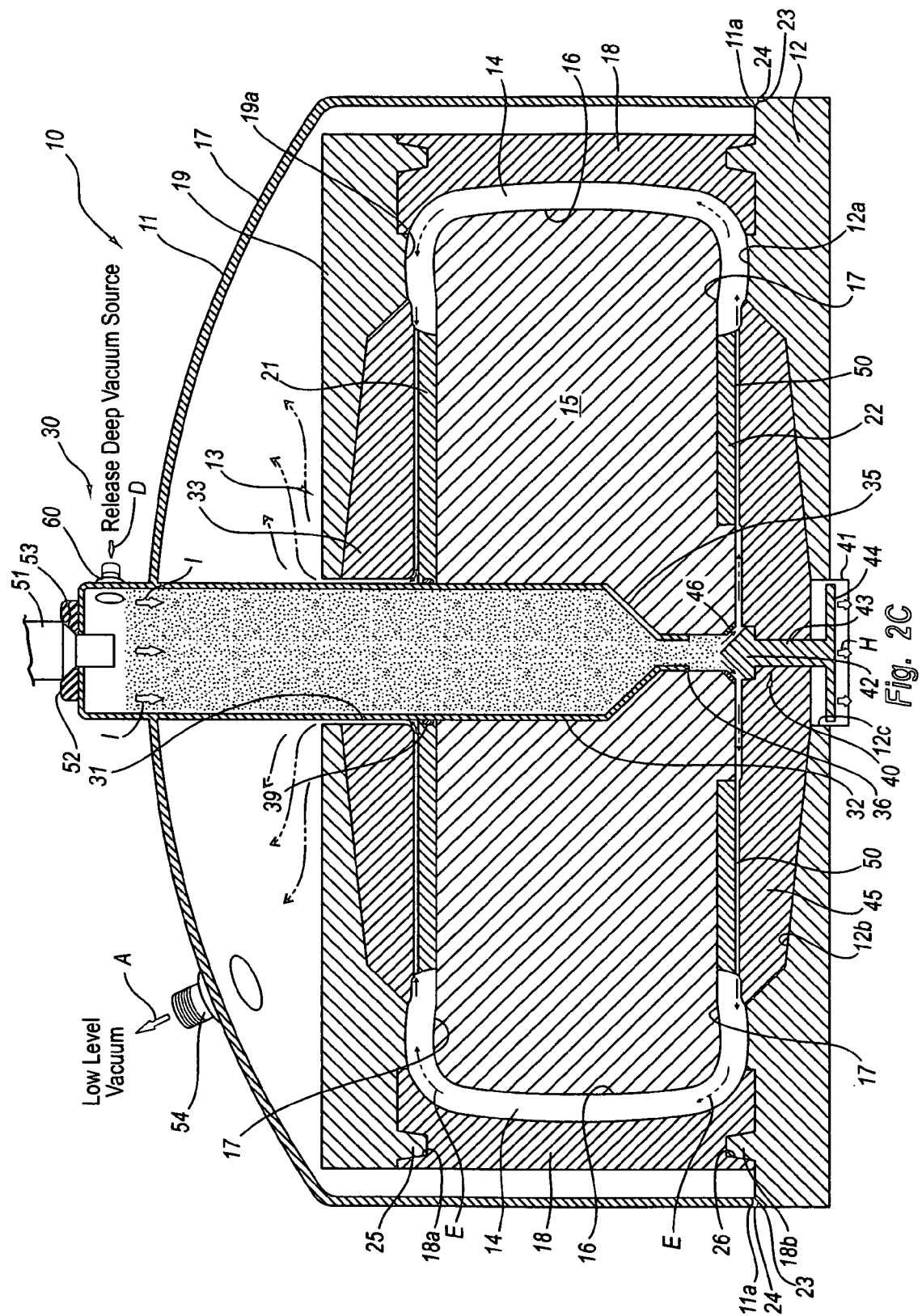

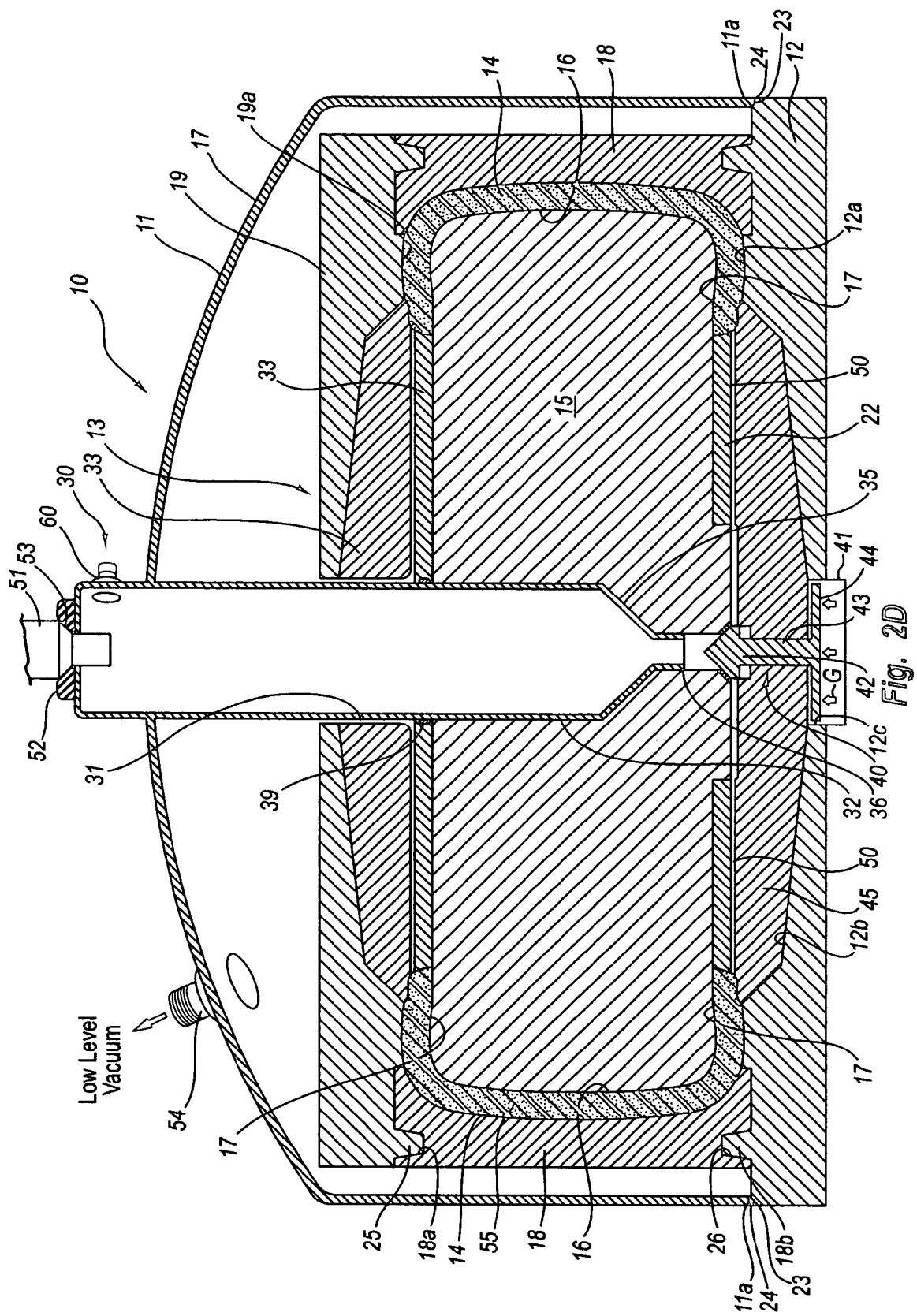

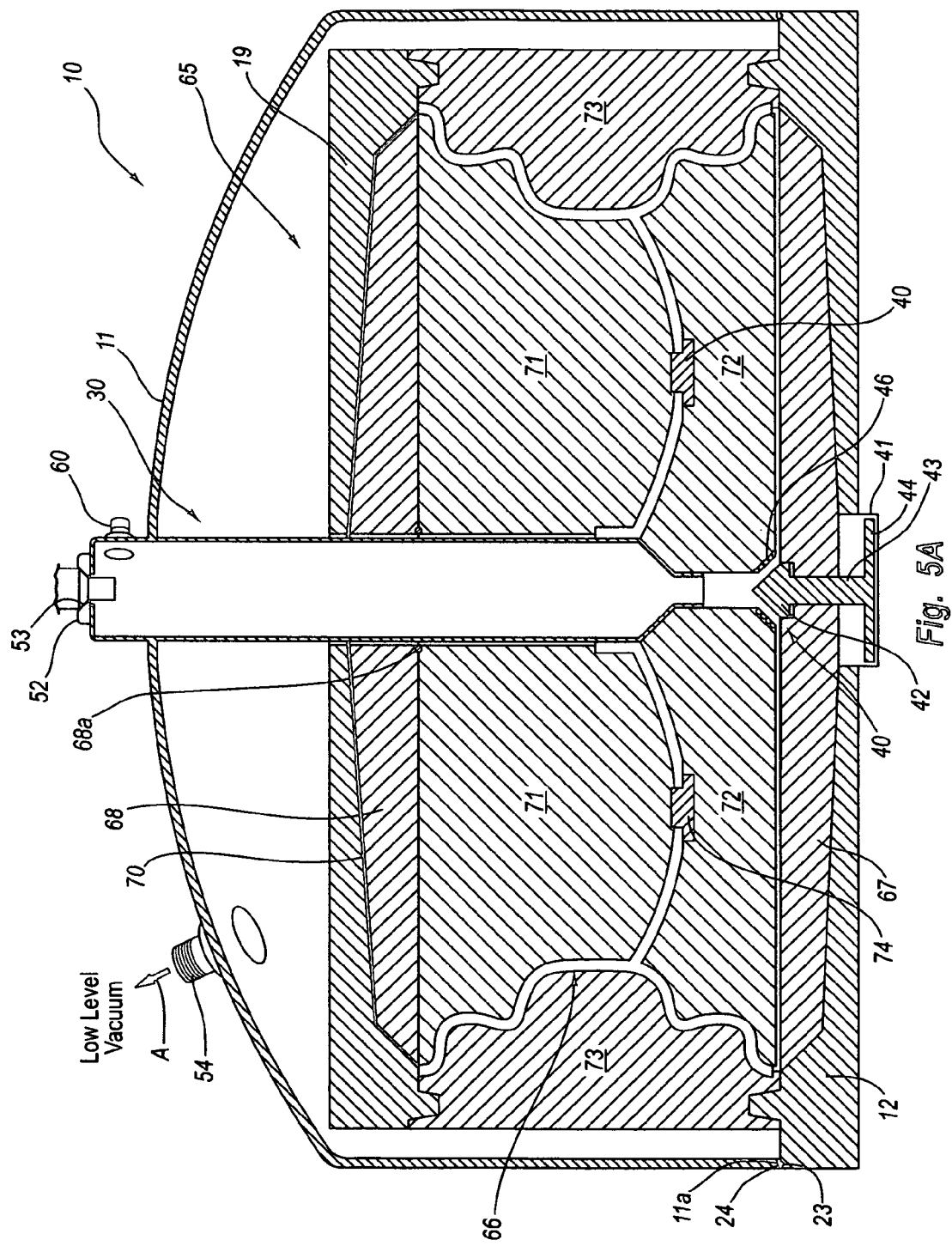

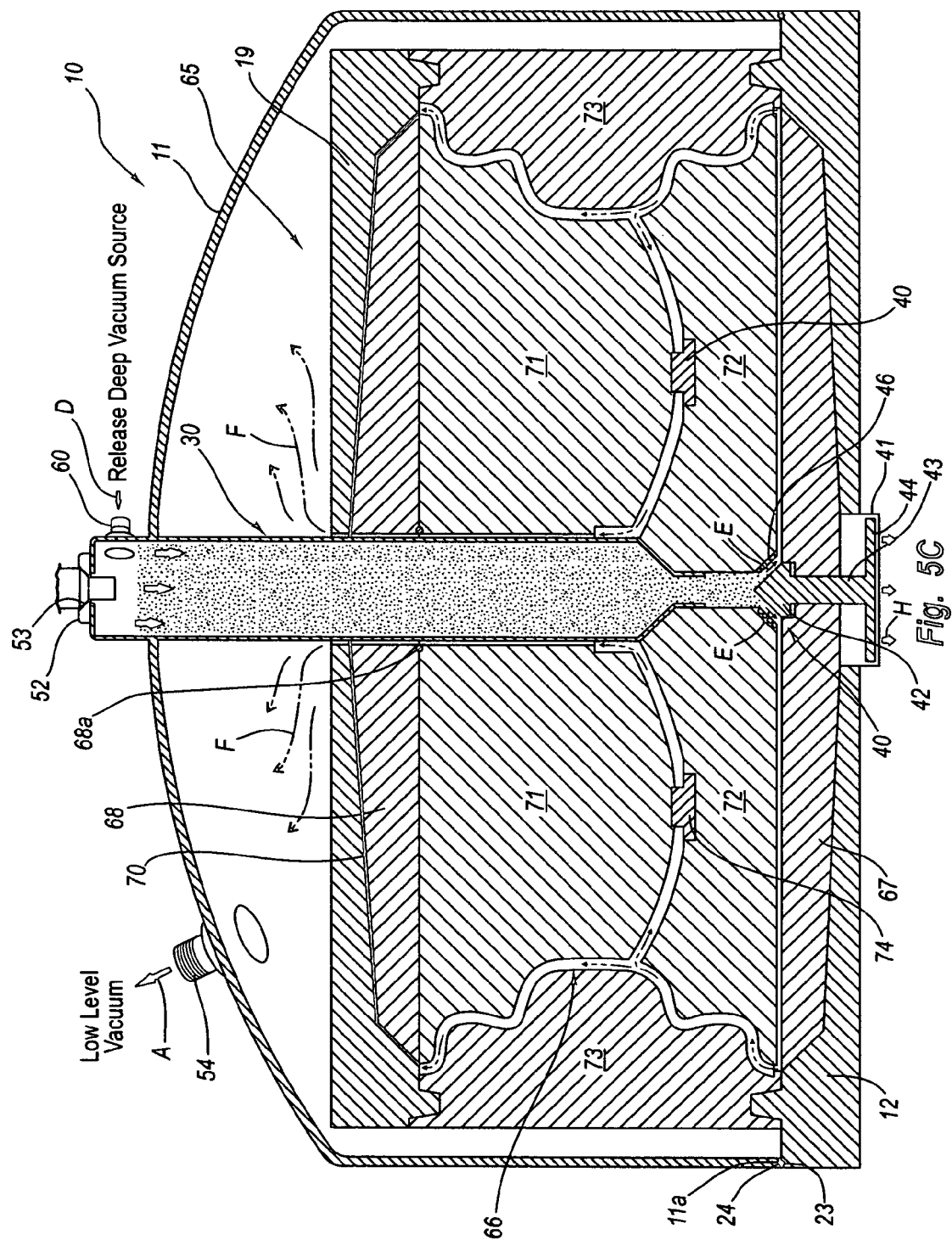

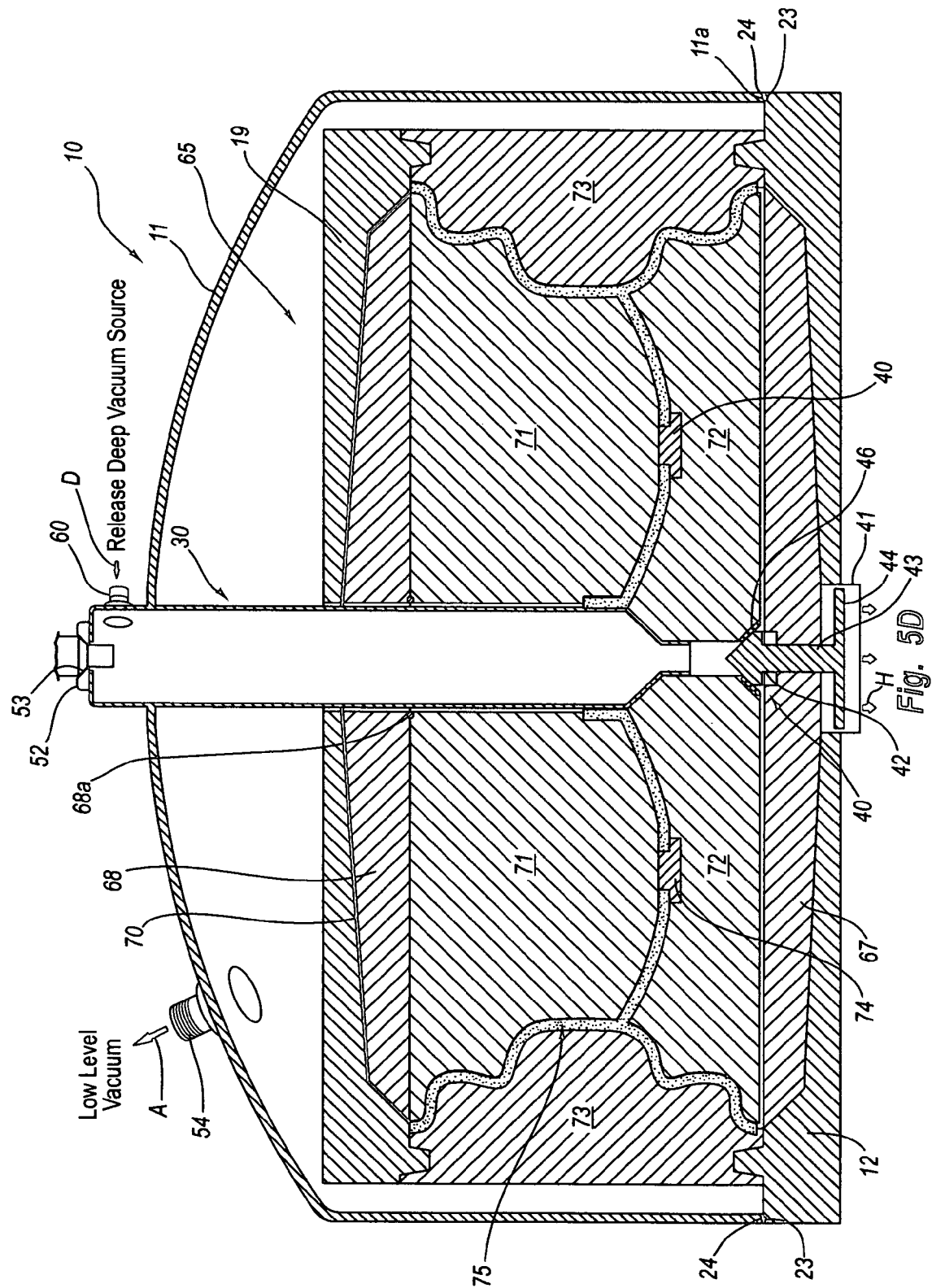

APPARATUS FOR VACUUM FORMING A TIRE, WHEEL OR OTHER ITEM FROM AN ELASTOMERIC MATERIAL

BACKGROUND OF INVENTION

1. Field of the Invention

This invention pertains to apparatus for vacuum forming a vehicle tire, wheel or the like, from a mixture of polyurethane constituents.

2. Prior Art

The present invention is in an improved vacuum forming apparatus that is versatile in its capabilities for forming, in a single casting operation, items such as a tire, wheel or the like. The improved vacuum forming apparatus includes a mold having a cavity that is in the shape of an item to be cast, and which cavity can be formed to accommodate a core, such as a core of plies, belts and beads, for forming a tire in the apparatus. Or the core can be one formed from steel or an aluminum compound, for encapsulating a wheel, or the like, that can be supported in the mold by spacers, or the like. With either core to receive a polyurethane material flowing therearound. In practice, a polyurethane material, that is a compound formulated to produce a cured material having the desired characteristics of the item being cast, is pulled, under vacuum, into a mold cavity. After curing, the mold is opened, and a homogenous tire, wheel, or other item, including an item with a core encapsulated therein, is removed.

Recently, vacuum forming apparatus were developed by others from a recognition that venting air from a tire tread mold cavity early in a casting process could eliminate the necessity for venting the cavity through spaced holes in the mold that materials from the tread will flow into during casting and form projections or "tits". The extensions or "tits" as project from the tire tread surface were either pulled off when the tire was removed from the mold, had to be cut off or wore off during tire use. To prevent this undesirable cosmetic anomaly it was recognized that air could be vented from the mold cavity just before tread casting, eliminating a necessity for providing flow passages or vents from the tire tread mold while still obtaining a smooth, un-pocketed or un-blemished, finished tread surface. Examples of such an introduction of a vacuum into a tire mold just prior to forming a tire tread are shown in U.S. Pat. Nos. 4,573,894 and 5,152,951. Specifically, U.S. Pat. No. 4,573,894 sets out a tire mold having a cavity that is for receiving and finally shaping the tire. The patent is defined by a surface that is for contacting the exterior of the tire during tire curing. The cavity is fluid connected to a single vacuum source for evacuating air from within the cavity during an early portion of a tire curing cycle to prevent air and any other fluid from becoming trapped between the tire and the surface that defines the cavity that will become the tire tread. Visual effects in the form of voids in the tire exterior are thus eliminated. Like the '894 patent, U.S. Pat. No. 5,152,951 also provides for the elimination of fluid from the mold cavity during an early portion of a tire curing cycle. The patent provides for fluid evacuation through a space between the surfaces of the mold parts that defines the mold parting line. Both patents provide a single vacuum source and its connection to the mold cavity for forming the tire side wall and tread surfaces.

Recently, the inventor of the present invention along with others developed "A Method and Apparatus for Vacuum Forming an Elastomeric Tire", U.S. patent application Ser. No. 10/936,635, filed Sep. 04, 2004, and "A Method and Apparatus for Vacuum Forming a Wheel for a Urethane Material", U.S. patent application Ser. No. 11/116,633, filed Apr. 29, 2005. These patent applications set out apparatus and methods for forming an elastomeric tire containing plies, belts and beads, and a wheel that may contain a metal core encapsulated by an elastomeric material, preferably a polyurethane material. Both applications involve an evacuation of air from the elastomeric mixture prior to its introduction into the mold cavity, and for pulling, under a vacuum, the air free mixture through the mold. Which air free flow of elastomeric material fills an area between inner and outer mold walls and for forming a tire, travels through the core of plies, belts and beads, producing a finished transport tire that is free of voids or pockets. With, for the other application, which elastomeric material, preferably a polyurethane, fills the mold cavity that has the wheel shape and may include a metal core.

The present invention is unique from the cited earlier vacuum forming apparatus in that it contains fewer seals and provides for a less restricted flow of a preferred urethane material through the mold cavity.

SUMMARY OF THE INVENTION

It is a principal object of the present invention to provide a vacuum forming apparatus for forming a urethane tire, a homogenous wheel from, or coating a wheel core with, a urethane material, or other item, that includes fewer seals and provides an improved flow path of the urethane material through a mold cavity.

Another object of the present invention is to provide a vacuum forming apparatus for forming an item, such as a wheel or tire, in a single operation, from a urethane material where the apparatus is easily opened to expose a cavity area thereof, includes a minimum number of interior seals, and is formed to promote a free flow of the urethane material through the cavity area Another object of the present invention is to provide an apparatus for forming an item, such as a tire or wheel, in a single operation, where the apparatus is a vacuum casting assembly that includes a canister that is initially placed under a deep vacuum as it receives a volume of mixed urethane constituents, with the vacuum pulling air from the mixture, and whereafter the canister is opened to atmosphere allowing the column of the air-free urethane mixture to pass through a canister exhaust valve and travel into a mold cavity that is formed between inner and outer mold surfaces that is maintained at a low-level vacuum under a bell shaped mold cover that seals onto a mold base plate, with the low level vacuum pulling the air-free urethane mixture through the mold interior, filling the mold cavity, and is allowed to cure into a homogeneous finished item.

Another object of the present invention is to provide, as a component of the vacuum forming apparatus, a mold containing a cavity that has the shape of a tire interior, wheel, or other appropriate item, and with the cavity formed between opposing top and bottom plate faces and around a cylindrical inner core, with outer mold segments fitted between the top and bottom plates, forming the mold cavity.

Still another object of the present invention is to provide a vacuum forming apparatus for manufacturing an item from a urethane material, such as a tire, wheel, or a similar item, where the vacuum forming apparatus includes a reservoir canister, that is preferably located within the mold annular area, but may be connected into a mold cavity through a hose, or the like, and which mold cavity mimics the inner and outer surface of an item to be molded, is under a low-level vacuum, and the reservoir canister is maintained under a deep vacuum whereby air as is trapped in an urethane mixture of constituents as are poured into the canister are removed, and whereafter, a canister valve is opened and the air-free urethane material mix is pulled into the mold cavity by the low-level vacuum, and which mold is contained within an outer bell shaped cover that seals against a mold base, and to the mold hub and contains the low-level vacuum.

Still another object of the present invention is to provide a vacuum forming apparatus for forming an item, such as a tire, wheel or like item, from a urethane material, where the apparatus includes an outer cover having a bell shape that includes a seal or seals around a base thereof for sealing onto a mold base plate, and the mold includes seals for separating the mold and mold cavity from a canister wherein the urethane material constituents are poured and subjected to a deep vacuum, with the area under the outer cover maintained under a low level vacuum.

Still another object of the present invention is to provide a vacuum forming apparatus for casting a homogenous item, such as a tire or wheel, or other item, where the tire is molded around an interior core of plies, belts and beads, and the wheel contains an inner metal core, which casting takes place in a single operation, producing a tire, wheel or like item that is essentially perfectly balanced.

The present invention is in a vacuum forming apparatus for casting a tire, wheel or like item, from a urethane material, preferably a polyurethane, where the material constituents will flow into a mold containing a cavity. The mold is assembled from components to contain a cavity having a shape of a tire, wheel or other item, and may provide for receiving standoffs or spacers fitted into the mold to support a tire or wheel core, or the like. The mold cavity receives a flow of a mixture of urethane material constituents that are selected to provide, when cured, a tire having a strength and resilience that is like or better than a conventional tire, or a wheel having a strength that is like that or better than a steel or aluminum wheel formed to support a design load. The urethane constituents mixture is poured into a canister that is maintained under a deep vacuum to remove the air from the mixture, and whereafter that canister is opened to pass an air free flow into, to fill, the mold cavity that is under a low level vacuum, flowing throughout the cavity and forming a homogenous tire, wheel or other item. Which mold cavity of a tire mold preferably includes a core of plies, belts and beads supported therein to receive a flow of a urethane constituents mixture pulled therearound and through by the low level vacuum. With, for a wheel cavity, the cavity can include a core formed of a-metal, such as steel or aluminum, that is to be encapsulated in the flow of the urethane constituents pulled therearound by the low level vacuum. The mold includes inner and outer mold components that, when assembled form the mold with a cavity that has the shape of a tire, wheel, or other item to be cast therein.

The mold includes a sleeve as a mold hub area that is arranged between top and bottom plates that each have the shape of opposite sides of the tire, wheel or other item to be cast therein, and a pair of half, quarter, or eighth ring outer mold segments are assembled into a ring that is positioned between the top and bottom plates, forming the cavity that is the image of the item to be cast. Which top and bottom plates include seals for closing off the mold cavity from, respectively, the canister and a bell shaped cover that fits over the top plate and onto the bottom plate. The outer mold segments are arranged to be easily removed when the mold top plate is lifted off the mold assembly, allowing the outer mold segments to be separated, providing for removal of a cast item.

For vacuum forming a tire, wheel or other item, the vacuum forming apparatus includes the mold canister that may, but need not, be formed to fit across the mold hub area that is to receive a mix of urethane material constituents and connects to a deep vacuum source for removing air from which mix. After air removal, the urethane mixture is passed through a needle valve into an annular mold cavity area, flowing across the mold cavity under the urging of a low level vacuum that is pulled through a top of the bell shaped cover that is fitted over the mold top plate and extends down the mold sides to seal onto the bottom plate. The urethane material mixture that is pulled through the mold fills the cavity. Further, if a core is contained in the mold, such can be supported on standoffs or spacers to allow the flow to encapsulate the core. For the invention, seals are arranged between the mold top plate and between the bell shaped cover and the canister and the bottom plate. For the invention, seals are not required between the individual outer mold segments as the low level vacuum is pulled from throughout the interior of the bell shaped cover eliminating a need for seals between the mold segments. The seals between the bell shaped cover and lower plate and canister, respectively, maintain the low level vacuum, and which low level vacuum and the deep vacuum are generated by separate vacuum sources.

Upon receipt of a set volume of the urethane material mixture the canister is sealed and is subjected to a deep vacuum. The vacuum is pulled through a port in the cannister, and is operated until the mix in the urethane mixture in the canister is essentially free of all the air that had been trapped therein during the mixing process. Thereafter, the canister is open to atmospheric pressure and a canister needle valve is opened to a flow path into the mold cavity, and, with the mold maintained under a low level vacuum that is present within the bell shaped cover, that vacuum pulls the urethane material flow through the mold cavity. The air free urethane mixture thereby flows into the mold cavity filling it and, if a core is present in that cavity, the flow encapsulates that core, providing a homogeneous urethane mixture within the cavity that then cures into the tire, wheel or other item. In which operation, any air in the mold will have traveled ahead of the mixture flow and out the outer mold ports where through the low level vacuum is being pulled. In practice, the needle valve is required to be closed as the canister empties and comes under ambient air conditions as are present in the canister, with a presence of the urethane mixture at the ports into the bell shaped cover indicating that the mold cavity has been filled. Then, after cooling, the mold is broken open and a completed tire, wheel or other item is removed that is essentially in perfect balance.

DESCRIPTION OF THE DRAWINGS

The invention may take physical form in certain parts and arrangement of parts, used to form the apparatus of and practice the steps of the invention that are herein shown as a preferred embodiment and will be described in detail in this specification and illustrated in the accompanying drawings which form a part hereof:

FIG. 2A shows a sectional view taken along the line 2A-2A of FIG. 1, showing the vacuum forming apparatus interior as containing a tire core build mandrel with a cylindrical canister fitted across the mandrel center and showing a cavity in the shape of a tire, with a low level vacuum shown at arrow A, being pulled through a valve in the top of the outer cover;

FIG. 2B is a view like that of FIG. 2A, and shows a mixture of urethane constituents poured into the center canister, arrow B, that is closed at a lower end by a needle valve, and with the canister containing the urethane mixture shown as being under a deep vacuum, arrow C, for removing air from the mixture of urethane constituents;

FIG. 2C shows a view like that of FIG. 2B only showing the cylindrical canister as having been filled with mixed urethane constituents wherefrom air has been removed and with the deep vacuum source released and the canister open to atmosphere, arrow D, and showing the needle valve as being opened to pass the urethane mixture therefrom to travel through the mold cavity, as illustrated by arrows E, with a low level vacuum present in the outer cover, arrow A, pulling air as was in that cavity to exhaust that air, arrows F, from the cavity into the space under the top of the outer cover;

FIG. 2D is a view like that of FIG. 2C only showing the urethane mixture as having been exhausted from the canister and the needle valve closed, and showing the urethane mixture as having filled the mold cavity;

FIG. 5A shows a view like that of FIG. 2A before a pour of a mixture of urethane constituents is passed into a cylindrical canister and showing a low level vacuum, arrow A, being pulled through a valve fitted through the top of the outer cover, and showing the mold cavity as formed to produce a wheel;

FIG. 5C shows a view like that of FIG. 2B only showing the cylindrical canister that has been filled with mixed urethane constituents wherefrom air has been removed and the deep vacuum source as having been released, with the canister open to atmosphere, arrow D, and showing the needle valve as being opened to pass the urethane mixture therefrom that travels through the mold cavity, as illustrated by arrows E, pulling air as was in that cavity as an exhaust from that cavity, arrows F, that travels into the space under the top of the outer cover;

FIG. 5D is a view like that of FIG. 5C only showing the urethane mixture as having been exhausted from the canister and the needle valve closed, and with the urethane mixture filling the mold cavity, forming a wheel.

DETAILED DESCRIPTION

Figure 1:
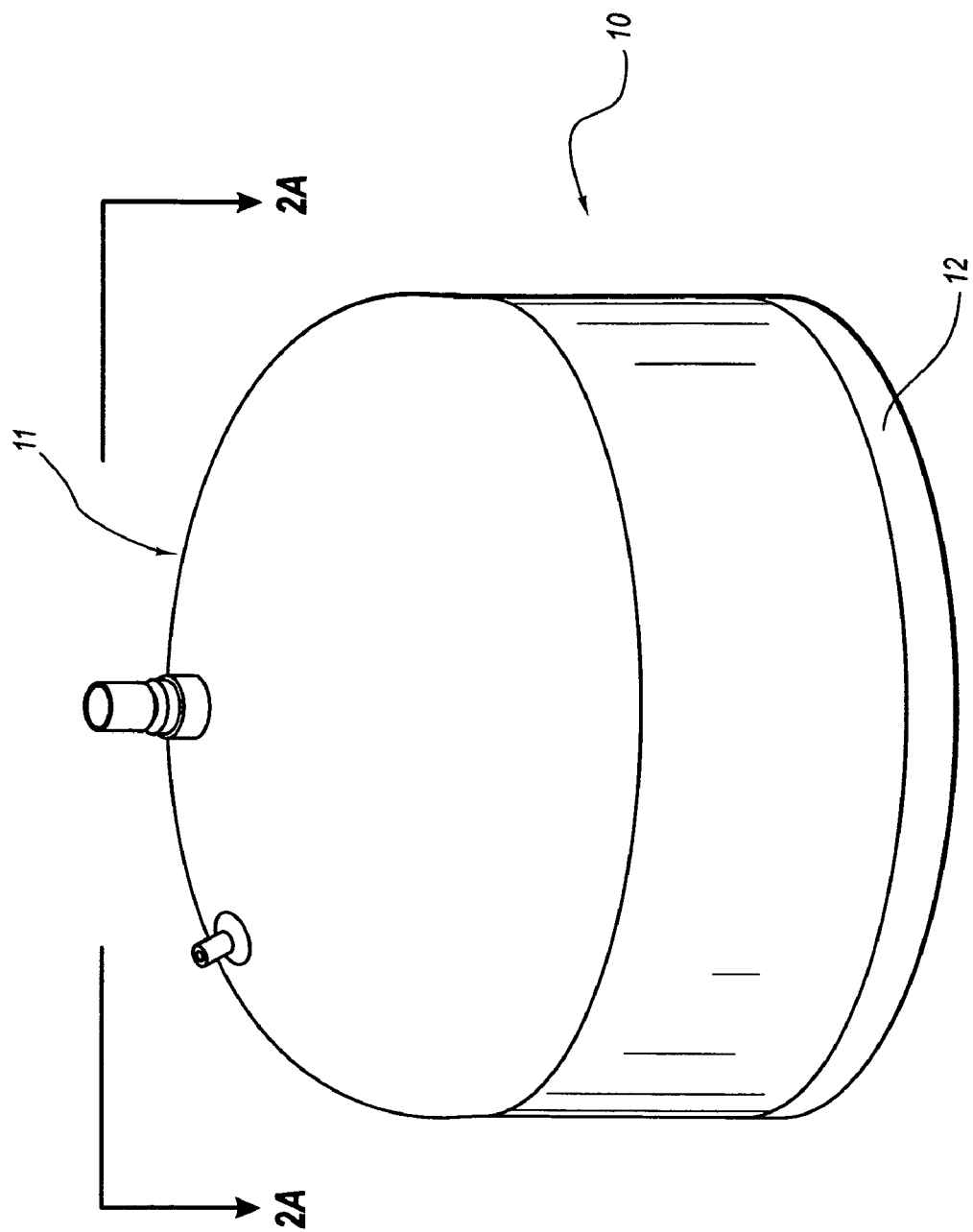
FIG. 1 shows a side elevation perspective view of a vacuum forming apparatus of the invention that includes a bell shaped outer cover for fitting onto an outer edge portion of a mold bottom plate.

The invention is in a vacuum forming apparatus for manufacturing a urethane tire, wheel or other item, that is formed as a homogenous unit, preferably from a cured polyurethane material. The cast tire preferably includes a core of plies, beads and a belt or belts, and a cast wheel may include a core, that is formed from metal such as a light gauge steel, or aluminum, that is to receive the urethane coating therearound, encapsulating that core in the urethane material. A mold is provided for forming a urethane tire or wheel in the apparatus of the invention. FIG. 1 shows a vacuum forming apparatus 10 of the invention as including a bell shaped outer cover 11 and a base plate 12. FIG. 2A is a cross sectional view of the vacuum forming apparatus 10 that shows the bell shaped outer cover 11 containing a mold 13 that includes the base plate 12 as a component thereof. The mold 13, as shown in FIGS. 2A through 2D and FIG. 3, has a cavity 14 that has a tire shape that, when a urethane material, preferably a polyurethane, is passed into which cavity, and the mold broken apart, produces a finished tire 55 like that shown in FIGS. 2D, 3 and 4. Additionally, for demonstrating the utility of the vacuum forming apparatus 10, FIGS. 5A through 5D and 6, show a mold 65 contained therein that has a cavity 66 that is for casting a wheel 75. It should therefore be understood that the vacuum forming apparatus 10 can be used to cast a number of items within the scope of this disclosure.

Like earlier vacuum forming apparatus and methods of manufacture for practice therein, as set out in the Prior Art section of the present application, the vacuum forming apparatus of the invention employs a mold. In FIG. 2A the mold 13 is shown as including a mandrel 15 that will receive a core of plies, belts and beads laid up thereon and may include separators fitted between the plies and belts. The tire core mandrel 15 is fitted into the mold 13 and has an outer or tread surface 16 and sides 17 whereon a tire core of plies, belts and beads is laid up that become the inner surface of the cavity 14. An outer surface of which cavity 14 is formed by mold tread segments 18 and portions 19a and 12a of top and bottom plates 19 and 12, respectively. Which top and bottom plates include upper and lower center dishes 21 and 22, respectively. The upper and lower center dishes are spaced apart from top and bottom bead alignment plates 33 and 45, respectively, of the mandrel 15 to allow for passage of a flow of elastomeric materials thereacross for filling the mold cavity 14, and venting to within the bell shaped outer cover 11, as set out herein below.

The base plate 12 is shown as stepped downwardly at 23 around its outer edge to receive a ring gasket 24 fitted therein that receives and seals to a lower end 1 1a of the bell shaped cover 11. The top and bottom plates 19 and 12, respectively, each include protruding lug rings 25 and 26, respectively, that fit into top and bottom slots 18a and 18b, respectively, for holding the mold 13 together.

FIG. 2A shows the mold containing a core, not shown, that has been formed on the mandrel 15 and shows the bell shaped outer cover 11 fitted onto the mold base plate 12. It should, however, be understood that the inner mold with its mandrel portion and outer mold arrangements can be varied, and other mold arrangements can be substituted therefore, within the scope of this disclosure. An example of such other mold arrangement is the mold 65 that contains a wheel cavity 66 of FIGS. 5A through 5D as set out and discussed herein-below.

During mounting of the bell shaped outer cover 11 onto the mold base plate 12 a cylindrical canister 30 that is secured through the center of the cover and extends into the top portion of the center 31 of the mold 13 is passed across a seal that is contained in opening 32 in the center of mandrel 15. Which mold top portion includes the top plate 19 that is fitted above a cylinder alignment plate 33 whose undersurface is spaced apart from the upper dish 21. Which spacing of the alignment plate 32 off from the upper dish 21 surface allows for a passage of a urethane material, preferably a liquid polyuretine, as is pulled under vacuum from the cylindrical canister 30 after passage of the material through the cavity 14. A lower end of the cylindrical canister 30 is shown as having been necked inwardly at 35, following an inwardly sloping lower portion of the mandrel, and ending in a canister open end 36 that is open into a valve seat 41 of a needle valve 40. Which needle valve 40 includes a head end 42 that is secured onto an end of a shaft 43 that extends at a right angle upwardly from the center of a flat bottom end 44. The shaft 43 is fitted in a center opening 46 that has been formed through a bottom plate 45 and is nested in a center concave section 12b of the base plate 12. Which base plate 12 includes a center opening 12c that opens to the undersurface of which bottom plate 45 and wherein the shaft 43 flat bottom end 44 is positioned. So arranged, up and down movement of the shaft 43 flat bottom end 44, as illustrate by arrow G in FIGS. 2B and 2D and arrows H in FIG. 2C, moves the needle valve 40 head end 42 into and out of engagement with the valve seat 41, opening and closing the needle valve 40. In which valve closing, sealing is provided by an outward sloping of the head end 42 as a cone sliding into sealing engagement with a matching sloped surface of the valve seat 41. With the head end 42 moved off of the valve seat 41, a passage 50 is open from the mandrel 15 hub to the cavity 14, allowing for passage of a urethane material flow from the canister 30 to the cavity 14.

FIG. 2A shows the canister 30 as having been emptied with the needle valve 40 open, and shows a pouring head 51 fitted into an opening 53 through a canister top 52. Which opening 53 has sloped sides to accommodate the pouring head 51. A vent fitting 54 has been passed through the top of the bell shaped cover 11, and shows, with arrow A, a low level vacuum being pulled through the vent fitting 54.

FIG. 2B shows the mold that will contain a core of beads, plies and belts, not shown, that has been formed on the mandrel 15, and shows the bell shaped outer cover 11 fitted onto the mold base plate 12. The needle valve 40 is shown as closed, illustrated by arrows G, and a pour of urethane constituents is shown as arrow B being poured through the pouring head 51 into the canister 30. During which pour, air as is entrained in the mixed urethane constituents is pulled under a deep vacuum, as illustrated by arrows C, from the mixture and through a canister port 60. During which urethane constituents pouring, a low level vacuum, arrow A, continues to be pulled through the vent fitting 54.

FIG. 2C shows the canister 30 as having been filled with the mixture of urethane constituents wherefrom entrained air has been pulled by the deep vacuum, with atmospheric pressure, arrows I, acting on the top of the mixture to urge it into the needle valve 40, against the head end 42. Which head end 42 is shown as having moved off of the nozzle end or seat 41. The movement of the needle valve head end 42 occurs with downward movement of the shaft 43 and the shaft flat bottom end 44 responsive to operation of, for example, a servo motor operating a piston, not shown, that connects to the valve shaft 43 flat bottom end 44, providing needle valve 40 operation.

Figure 3:
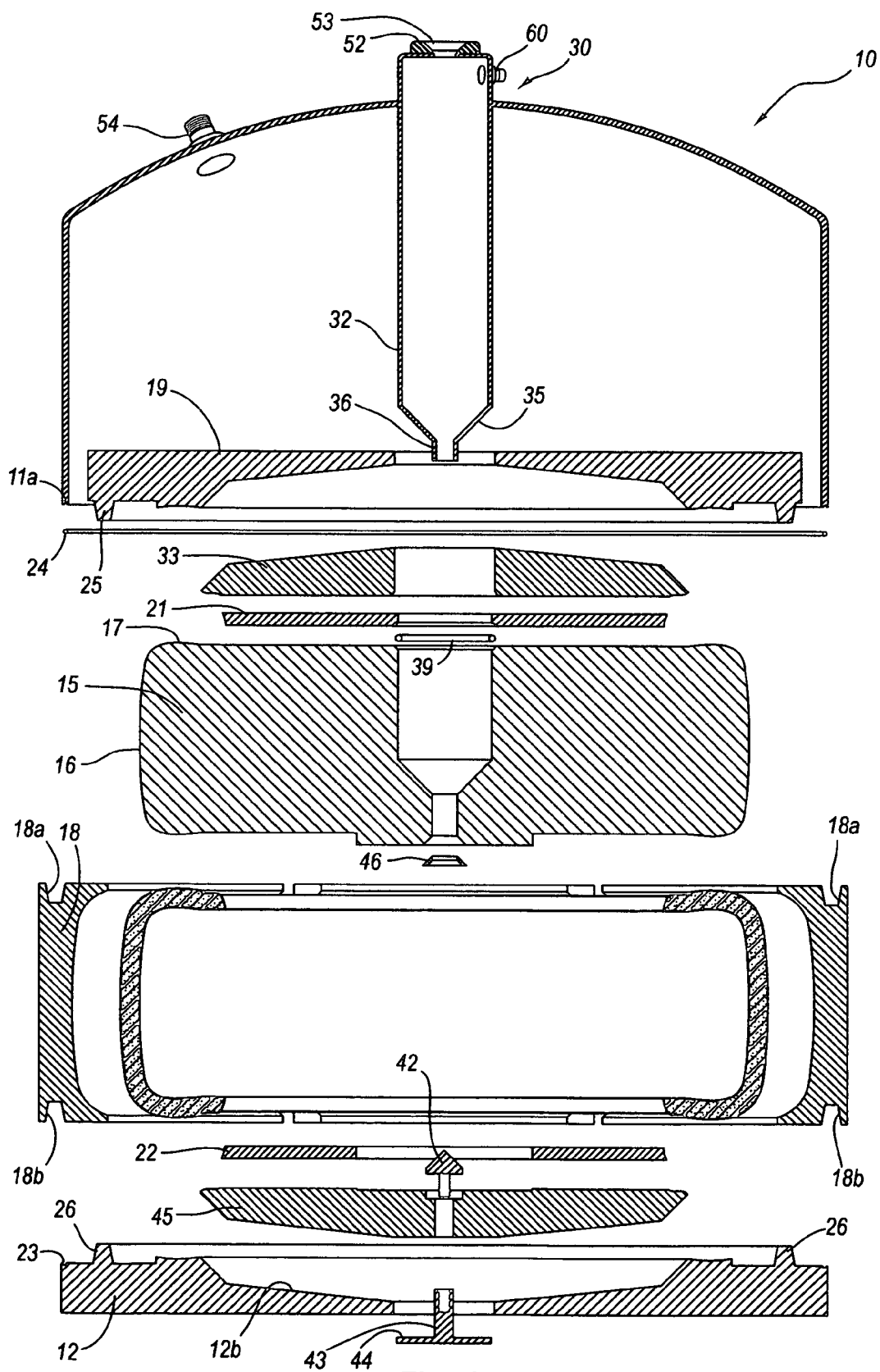
FIG. 3 shows an exploded front elevation view of the vacuum forming apparatus and showing a tire as having been cast therein.
Figure 4:
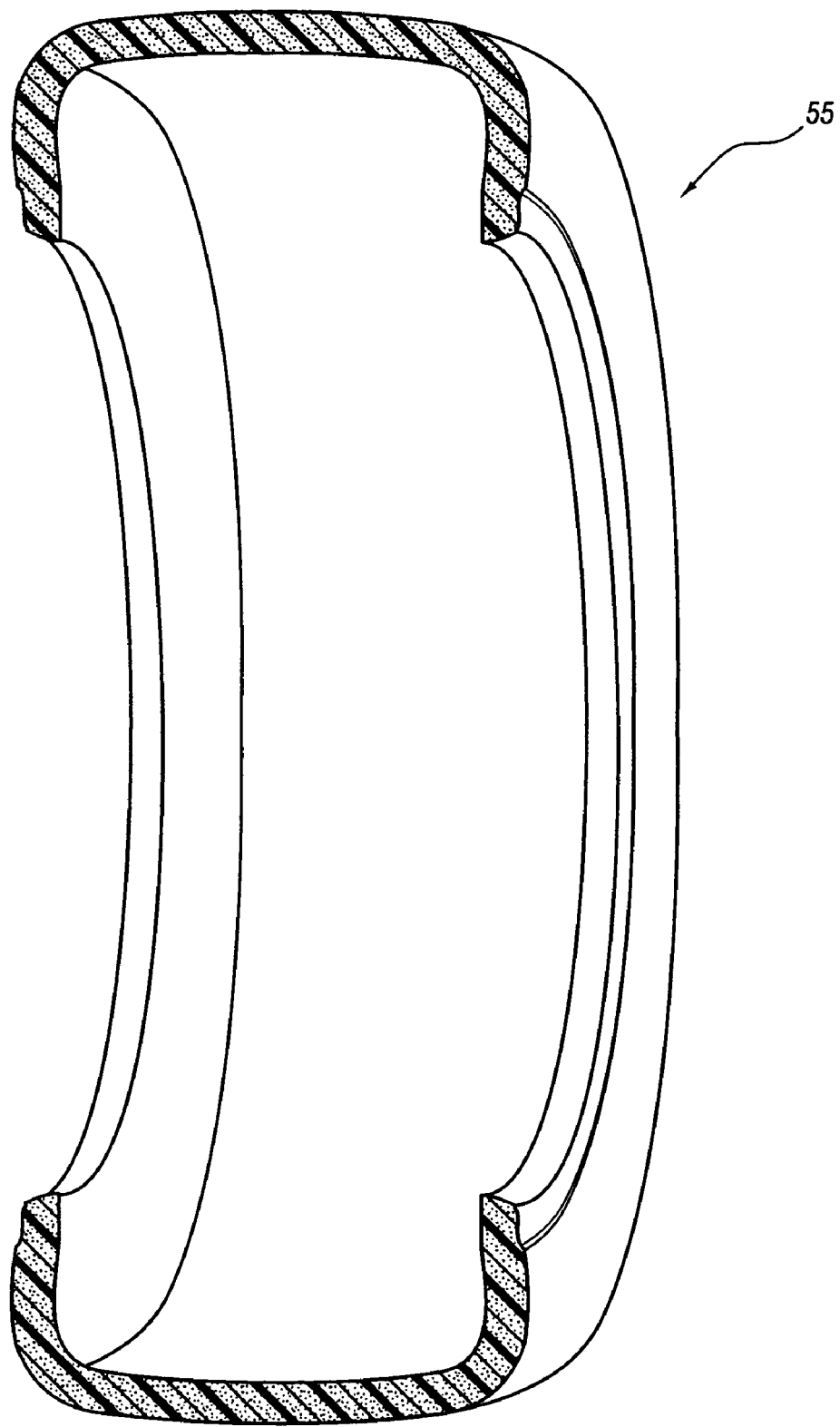
FIG. 4 shows a side elevation view of a section of a tire removed from the vacuum forming apparatus and taken off a build core mandrel of FIG. 2D.

Upon opening of the needle valve 40, the urethane mixture is urged by the presence of atmospheric pressure in the canister 30, arrows I, acting upon the top of the column of urethane mixture in the cylinder 30, and with that mixture pulled by the low level vacuum as is present in the bell shaped cover 11 it passes through the vent fitting 54, as illustrated by arrow A. Which flow of urethane mixture is pulled through the passages 50, shown as arrows E, and flows through the cavity, pushing an air flow, shown as arrows F, ahead of that flow with the air flow traveling out of the vent fitting 54. A measured flow of urethane mixture is thereby passed out of the canister 30. Whereafter, the needle valve is closed when the cavity 14 is filled, forming tire 55, as shown in FIGS. 2D, 3 and 4.

In contrast with the earlier pending U.S. patent application Ser. Nos. 10/936,635 and 11/116,633 cited in the Prior Art section herein that show vacuum forming apparatus, the present invention by employing a bell shaped cover 11, that extends to seal to the base plate 12, provides for maintaining the low level vacuum outside of the mold in the vacuum process, negating a need for seals between the tire segments 18 and at the junction of the tire segments and top plate 19. A vacuum forming apparatus 10 is thereby provided that is more easily assembled and, as it has fewer seals than earlier apparatus, and can be operated reliably without fear of leakage past the tread segments 18 that could result in a defective tire 55.

The urethane material constituents as are preferred for forming the tire 55 are a liquid isocyanate and a liquid poly, respectively, that are selected to form, when combined and cured, a tire having a desired hardness or derometer for an automobile or like transport tire. In practice, the deep vacuum as is used to remove air from the mixture of urethane constituents is at least a ninety six (96) percent vacuum, and the low level vacuum is at least eighty five (85) percent, and not greater than ninety five (95) percent, and which preferred low level vacuum is pulled through the vent port 54.

Figure 5B:
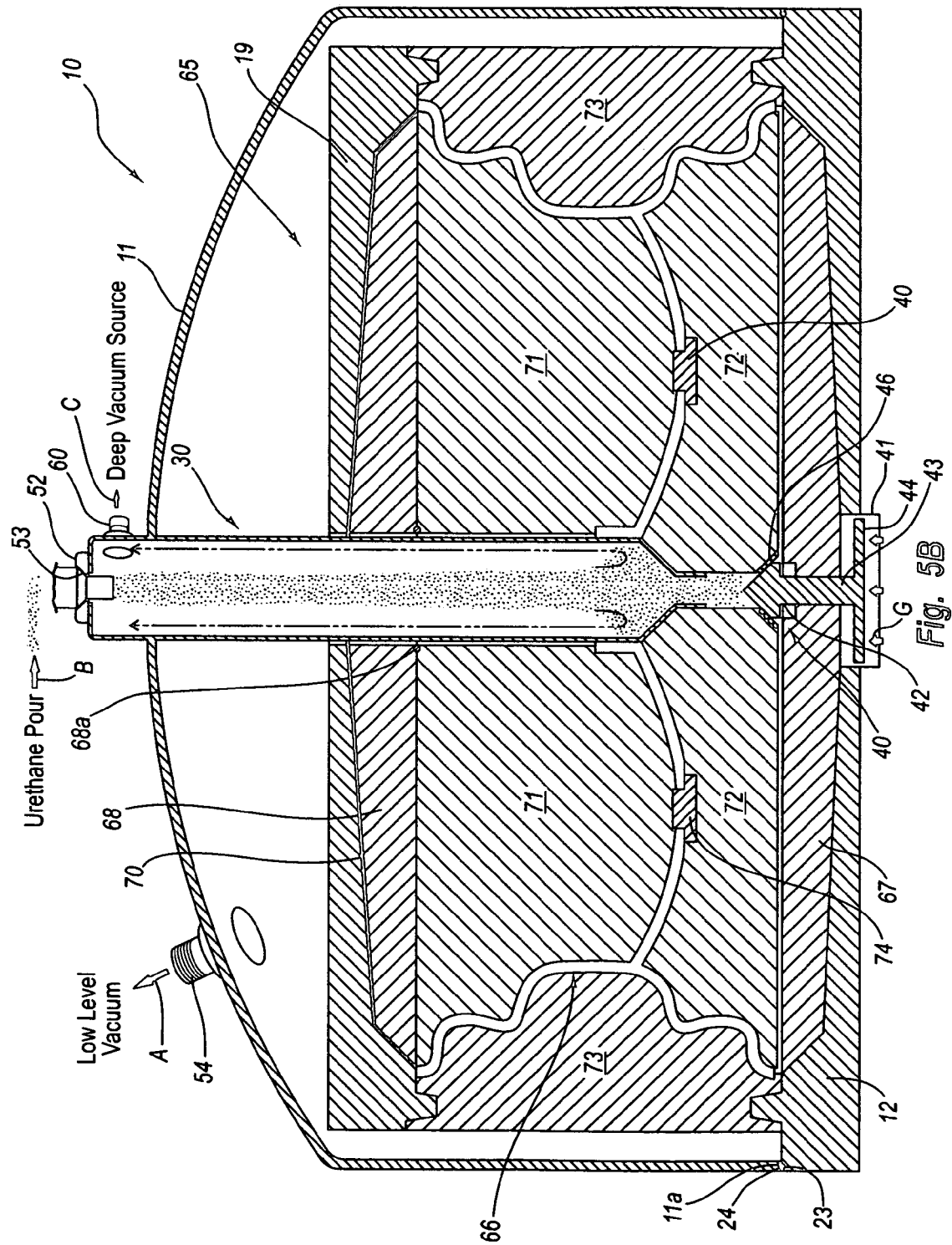
FIG. 5B shows a view like that of FIG. 2B that shows a mixture of urethane constituents poured into the center canister, arrow B, that is closed at a lower end by a needle valve, and with the canister containing the urethane mixture shown as being under a deep vacuum, arrow C, for removing air from the mixture of urethane constituents.

FIG. 5A shows the vacuum forming apparatus 10 of the invention that contains a wheel mold 65 that includes a wheel cavity 66. The vacuum forming apparatus 10 of FIGS. 5A through 5D, is like that shown in FIGS. 1, 2A through 2D and 3, and is shown as including the bell shaped cover 11 having a lower edge for fitting onto a stepped section 23 of the mold base plate 11. Which stepped section is to receive a gasket 24 fitted therein, for sealing the bell shaped cover 11 onto the mold base plate 12. The mold base 12, it should be understood, is the same for both of the illustrated uses of the vacuum forming apparatus 10 of the invention for forming, respectively, the tire 55 and the wheel 75. In FIG. 5A mold 65 is shown as including the mold base plate 12 and receives the bell shaped cover 11 fitted thereover. The vacuum forming apparatus 10 of FIGS. 5A through 5D, it should be understood, is and functions like the vacuum forming apparatus of FIGS. 2A through 2D and therefore the same numbering of the components of the vacuum forming apparatus of FIGS. 2A through 2D have been used on the vacuum forming apparatus 10 components and FIGS. 5A and 5D. The functioning of the vacuum forming apparatus 10 and its components of FIGS. 5A through 5D, it should be understood, are like those described above with respect to FIGS. 2A through 2D.

The mold 65 of FIGS. 5A through 5D is, of course, different from the mold 13 of FIGS. 2A and 2D in that its cavity 66 has the shape of a vehicle wheel 75, rather than the transport tire 55 of the mold 13. Which cavity 66, as shown, is not formed to contain a core formed on a mandrel surface like the tire core mandrel 15 of FIGS. 2A through 2D. However, within the scope of this disclosure, the cavity 66 can be configured to contain a wheel core, not shown, that is centered therein as by standoffs, not shown, or other appropriate arrangement, for separating the core from the cavity walls, with the wheel core to receive a flow of the urethane material traveling therearound in the wheel forming process. Such wheel core can be formed from metal, such as steel or aluminum, and would be incorporated in the wheel to add strength thereto.

A utilization of the vacuum forming apparatus 10 for forming the wheel 58 is identical to the discussion set out above with respect to forming of the tire 55, and, accordingly, the item numbering and arrows lettering for the vacuum forming apparatus 10 of FIGS. 5A through 5D is shown as being like that set out in FIGS. 2A through 2D, and includes the bottom plate of the apparatus of FIGS. 2A through 2D, but distinct therefrom the apparatus of FIGS. 5A through 5D is shown to contain the mold 65 resting on the bottom plate 12, and whereon a spacer plate 67 is fitted. Which spacer plate 67 is like the bead alignment plate 45 of FIGS. 2A through 2D, but only functions to allow for passage of the flow of urethane materials from operation of the needle valve 40 into the cavity 61.

The mold 65 of FIGS. 5A through 5D, like the mold 13, also includes a top plate 19 whose undersurface has a spacer plate 68 that is like the top bead alignment plate 33 shown in FIGS. 2A through 2D, except, of course, that it does not provide for bead positioning, but rather is arranged to provide for cavity 61 venting through a passage 70 located between the top of the spacer plate 68 and the undersurface of the top plate 19, and a hub end 68a of the undersurface. Which spacer plate 68 is formed to receive a ring gasket 69, isolating the cylindrical canister 30 outer surface from the mold 65 hub. The cylindrical canister 30 is to hold and dispense a mixture of urethane constituents poured therein as described above with respect to the vacuum forming apparatus 10 of FIGS. 2A through 2D.

FIG. 5A shows the mold 65 as including the top plate 19 and bottom plate 12, sandwiching an assembly of top and bottom mold sections 71 and 72, respectively, between an outer ring segment 73. So arranged the wheel shaped cavity 66 is formed as a space between the opposing top and bottom mold surfaces 71 and 72 and the opposing surfaces of the inner surface of the outer ring segment 73 and the outer ends of the top and bottom mold sections 71 and 72. Lug hole disks 74 are shown as positioned in the mold cavity 66 to direct a flow of urethane material therearound that, when removed after casting, leave lug holes 76 in the cast wheel 75.

FIGS. 2A through 2D described the operation of the vacuum forming apparatus 10 for forming the tire 55 of FIG. 4. In practice, the components and operation of the vacuum forming apparatus 10, as shown in FIGS. 5A and 5D, it should be understood, are essentially identical to the components and their operation shown in FIGS. 2A through 2D and, therefor the description as referenced to FIGS. 2A through 2D should be taken as the description of the components and their interaction of FIGS. 5A and 5D, and so will not be further described herein.

Figure 6:
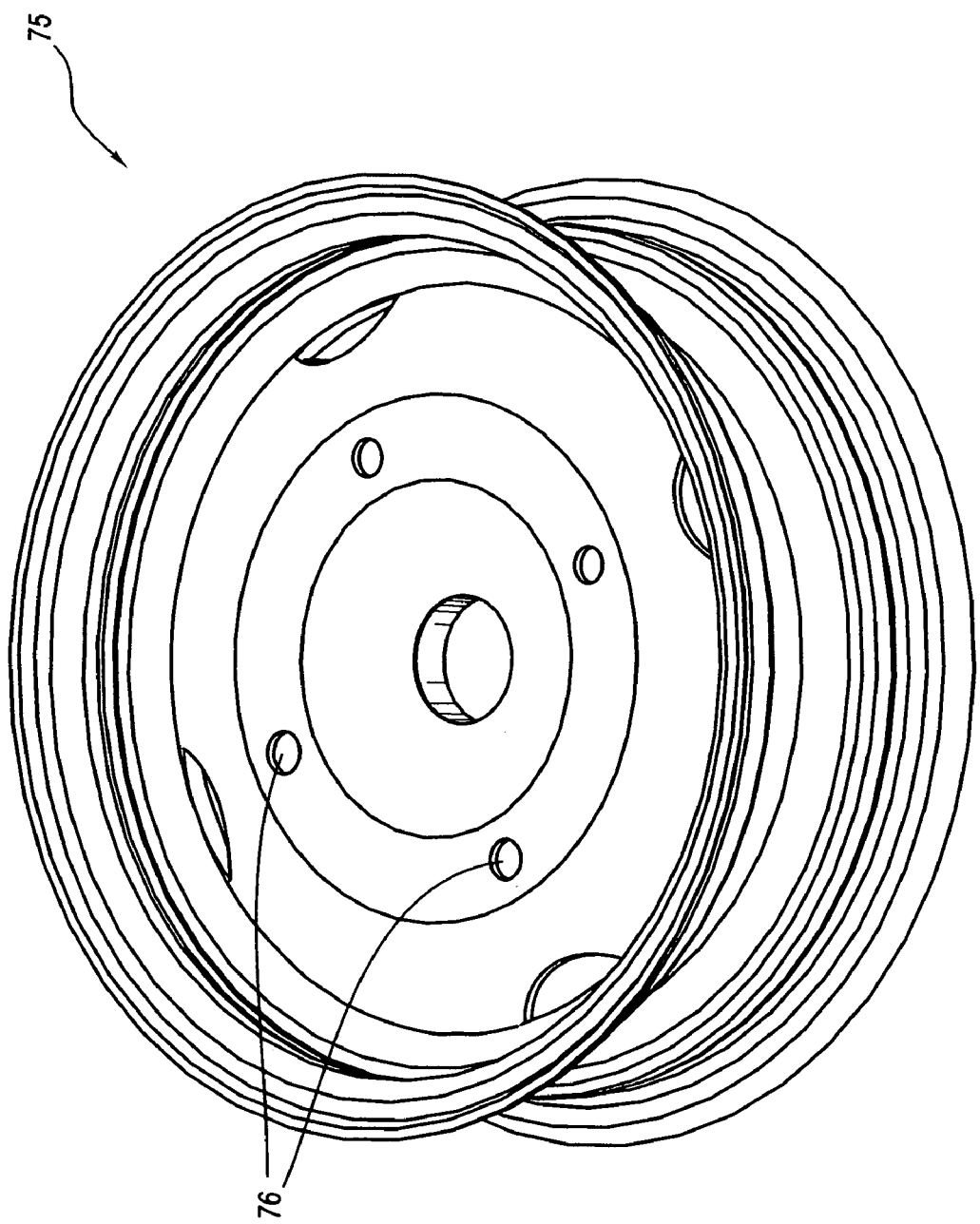
FIG. 6 shows a side elevation prospective view of a wheel that has been removed from the mold of FIG. 5D.

The invention in a vacuum forming apparatus 10 of FIG. 1 has been shown herein configured for producing a urethane tire 55, as shown in FIGS. 2A through 2D and 3, and a urethane wheel 75, as shown in FIGS. 5A through 5D. Which wheel 75 includes lug holes 76, as shown in FIG. 6. It should be understood that the formation of the tire 55 and wheel 75 involve like operation of the vacuum forming apparatus 10, of the invention, demonstrating the versatility of the invention. It should therefore be understood that, the vacuum forming apparatus 10 of the invention can be configured to produce a number of other items within the scope of this disclosure.

While a preferred embodiment of my invention in a vacuum forming apparatus for forming a urethane tire, wheel or other item, in a single operation, have been shown and described herein, it should be understood that variations and changes are possible to the apparatus and its use and in the materials as are suitable for use in the invention, without departing from the subject matter coming within the scope of the following claims, and a reasonable equivalency thereof, which claims I regard as my invention.

I claim:

1. A vacuum forming apparatus that utilizes a mold comprising, the mold contains a cavity having a shape of an item to be cast from a urethane material and said cavity is open to receive a urethane material flow; a bell shaped outer cover having a lower lip to fit onto a hub area at a lower portion of said mold and receive at least one ring seal, and said bell shaped cover provides a space therein that contains said mold and that said cavity of said mold vents into and includes a port that is connected to a low level vacuum source; a canister for receiving a mixture of urethane constituents and has an open top that includes a vent port extending outwardly therefrom, mounts a valve seat to pass said urethane material flow through said valve seat and into said mold cavity, and includes a ring seal for isolating a canister outer surface from an area under said bell shaped outer cover, and a valve means that includes a movable member to fit into and close over said valve seat, and said valve means is arranged to open into a mold passage that connects to said cavity to pass a liquid flow of said mixture of urethane constituents therefrom; and means for pulling a deep vacuum through said canister vent port to pull air from said canister.

2. The vacuum forming apparatus as recited in claim 1, wherein the bell shaped outer cover has a dome shaped outer surface and the port is fitted through said bell shaped outer cover and into a cavity between said bell shaped outer cover and the top of the mold.

3. The vacuum forming apparatus as recited in claim 2, wherein the canister is cylindrical and is fitted through a center opening formed through the bell shaped outer cover that aligns with a center of said hub area of the mold, and the valve means is mounted in a canister bottom to vent into the mold passage at said mold passage opening into a lower end of the mold cavity.

4. The vacuum forming apparatus as recited in claim 3, wherein the valve means is a needle valve that includes a cone shaped top end that is to seat into an end of the canister, includes a straight stem fitted to slide up and down in a passage formed through a mold bottom plate, and includes a bottom end for mounting to a means for moving said needle valve bottom end up and down.

5. The vacuum forming apparatus as recited in claim 3, wherein the urethane constituents are mixed and poured through a pouring head that is fitted, in sealing engagement, through a top end of the canister.

6. The vacuum forming apparatus as recited in claim 1, wherein the mold is formed from top and bottom plates with a ring shaped outer mold segment sandwiched therebetween and with said top and bottom plates each including a mold segment that, with the mold assembled, are opposing inner surfaces that, along with the inner surface of said ring shaped outer mold segment, form a cavity having the shape of an item to be cast.

7. The vacuum forming apparatus as recited in claim 6, wherein the canister is a cylinder that is fitted through a center of the bell shaped cover and into an open center area between the top and bottom plates, across said open area therebetween, and said cylinder is open at a top end to receive a pouring head fitted therein that is open to pass a flow of the mixture of urethane constituents therein, and said cylinder is necked down at its lower end into a tube whose open end is said valve seat that a needle valve tapered head of said valve means fits into.

8. The vacuum forming apparatus as recited in claim 1, wherein the bell shaped outer cover includes a cylindrical side wall that ends in a surface for fitting onto a lip of a lower plate, and includes the ring seal arranged between said side wall end and said lower plate lip, and the canister is fitted through a center hole through a top of said bell shaped outer cover and includes the ring seal arranged between an edge of a hole through a center of an upper plate and the outer surface of said canister.

9. The vacuum forming apparatus as recited in claim 1, wherein the passage extends from a needle valve exhaust end across a base plate located below the mold, and into the cavity.

* * * * *